«12» United States Patent
Traynor et al.

(10) Patent No.: US 11,176,960 B2
(45) Date of Patent: Nov. 16, 2021

(54) METHOD AND APPARATUS FOR DIFFERENTIATING BETWEEN HUMAN AND ELECTRONIC SPEAKER FOR VOICE INTERFACE SECURITY

(71) Applicant: UNIVERSITY OF FLORIDA RESEARCH FOUNDATION, INC., Gainesville, FL (US)

(72) Inventors: Patrick G. Traynor, Gainesville, FL (US); Logan E. Blue, Gainesville, FL (US); Luis Vargas, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 120 days.

(21) Appl. No.: 16/444,893

(22) Filed: Jun. 18, 2019

(65) Prior Publication Data

US 2019/0385634 A1    Dec. 19, 2019

Related U.S. Application Data

(60) Provisional application No. 62/686,550, filed on Jun. 18, 2018.

(51) Int. Cl.
*G10L 25/69* (2013.01)
*H04R 1/40* (2006.01)
(Continued)

(52) U.S. Cl.
CPC ............ *G10L 25/69* (2013.01); *G10L 15/22* (2013.01); *G10L 21/0232* (2013.01);
(Continued)

(58) Field of Classification Search
CPC .. G10L 15/22; G10L 21/0232; G10L 21/0316; G10L 25/18; G10L 25/21;
(Continued)

(56) References Cited

U.S. PATENT DOCUMENTS

2015/0088509 A1*  3/2015  Gimenez ................. G10L 17/22
                                                         704/243
2015/0325253 A1* 11/2015  Matsuo ............... G10L 21/0364
                                                         704/225
(Continued)

FOREIGN PATENT DOCUMENTS

WO    WO-2007076279 A2 *  7/2007  ............. G10L 25/93
WO    WO-2014160678 A2 * 10/2014  ............. G10H 1/12

OTHER PUBLICATIONS

*2017 Vice Assistant Trends [Infographic]*, (1 page), Jul. 12, 2017, (online). [Retrieved from the Internet Feb. 20, 2020] <https://ifttt.com/blog/2017/07/voice-assistant-trends-infographic>.
(Continued)

*Primary Examiner* — Pierre Louis Desir
*Assistant Examiner* — Nicole A K Schmieder
(74) *Attorney, Agent, or Firm* — Alston & Bird LLP

(57) ABSTRACT

A system for distinguishing between a human voice generated command and an electronic speaker generated command is provided. An exemplary system comprises a microphone array for receiving an audio signal collection, preprocessing circuitry configured for converting the audio signal collection into processed recorded audio signals, energy balance metric determination circuitry configured for calculating a final energy balance metric based on the processed recorded audio signals, and energy balance metric evaluation circuitry for outputting a command originator signal based at least in part on the final energy balance metric.

20 Claims, 15 Drawing Sheets

(51) Int. Cl.

| | |
|---|---|
| *H04R 3/00* | (2006.01) |
| *G10L 25/21* | (2013.01) |
| *G10L 15/22* | (2006.01) |
| *G10L 21/0232* | (2013.01) |
| *G10L 21/0316* | (2013.01) |
| *G10L 25/18* | (2013.01) |

(52) U.S. Cl.
CPC .......... *G10L 21/0316* (2013.01); *G10L 25/18* (2013.01); *G10L 25/21* (2013.01); *H04R 1/406* (2013.01); *H04R 3/005* (2013.01); *G10L 2015/223* (2013.01)

(58) Field of Classification Search
CPC ... G10L 25/69; G10L 2015/223; H04R 1/406; H04R 3/005
USPC ........................................................ 704/234
See application file for complete search history.

(56) References Cited

U.S. PATENT DOCUMENTS

2017/0200451 A1\* 7/2017 Bocklet .................... G10L 17/02
2019/0115030 A1\* 4/2019 Lesso ....................... G10L 17/00

OTHER PUBLICATIONS

*Adobe Demos "Photoshop For Audio," Lets You Edit Speech as Easily as Text*, ARS Technica, (4 pages), (2017), (online). [Retrieved from the Internet Feb. 14, 2020] <https://arstechnica.com/information-technology/2016/11/adobe-voco-photoshop-for-audio-speech-editing/>.
*Amazon Echo & Alexa Devices*, Amazon.com, (7 pages), (2017), (online). [Retrieved from the Internet Feb. 14, 2020] <https://wwwamazon.com/Amazon-Echo-And-Alexa-Devices/b?ie=UTF8&node=9818047011>.
*Siri—Apple*, (21 pages), (2017), (online). [Retrieved from the Internet Feb. 14, 2020] < https://wwwapple.com/ios/siri/>.
*August Home Supports the Google Assistant*, (2 pages), (2017), (online). [Retrieved from the Internet Feb. 14, 2020] <http://august.com/2017/03/28/google-assistant>.
*Cortana—Your Personal Productivity Assistant*, (3 pages), (2017), (online). [Retrieved from the Internet Feb. 14, 2020]<https://wwwmicrosoft.com/en-us/windows/cortana>.
*Google Assistant—Your Own Personal Google*, (5 pages), (2017), (online). [Retrieved from the Internet Feb. 14, 2020] <https://assistantgoogle.com/>.
*Google Home Now Lets You Shop By Voice Just Like Amazon's Alexa*, TechCrunch, (8 pages), (2017), (online). [Retrieved from the Internet Feb. 14, 2020] <https://techcrunch.com/2017/02/16/google-home-now-lets-you-shop-by-voice-just-like-amazons-alexa/>.
*Lyrebird: Interoperability For Grasshopper and Revit*, (1 page), (2017), (online). [Retrieved from the Internet Feb. 14, 2020] <https://github.com/logant/Lyrebird>.
Noto, Grace. *Starling Bank Integrates API Into Google Home*, Bank Innovation, (4 pages), Feb. 20, 2017, (online). [Retrieved from the Internet Feb. 14, 2020] <http://bankinnovation.net/2017/ 02/starling-bank-integrates-api-into-google-home-video/>.
Aleksic, Petar S. et al. *Audio-Visual Biometrics*, Proceedings of the IEEE, vol. 94, No. 11, pp. 2025-2044, Nov. 2006.
Atrey, Pradeep K. et al. *Multimodal Fusion For Multimedia Analysis: A Survey*, Multimedia Systems, vol. 16, No. 6, pp. 345-379, Nov. 2010. DOI: 10.1007/s00530-010-0182-0.
Blue, Logan et al. *2MA: Verifying Voice Commands Via Two Microphone Authentication*, In Proceedings of the 2018 ACM on Asia Conference on Computer and Communications Security, pp. 89-100, Jun. 4-8, 2018. ACM, 2018, Incheon, Republic of Korea.
Carlini, Nicholas et al. *Hidden Voice Commands*, In 25th USENIX Security Symposium, pp. 513-530, Aug. 10-12, 2016. ISBN 978-1-931971-32-4.
Chetty, Girija et al. *Liveness Verification in Audio-Video Speaker Authentication*, In Proceedings of the 10$^{th}$ Australian International Conference on Speech Science & Technology, pp. 358-363, Dec. 8-10, 2004, Sydney, Australia.
Eveno, Nicolas et al. *Co-Inertia Analysis For "Liveness" Test in Audio-Visual Biometrics*, In Proceedings of the 4$^{th}$ International Symposium on Image and Signal Processing and Analysis, pp. 257-261, (2005).
*Actions on Google Transactions*, Google Developers, pp. 1-3, (2017), (online). [Retrieved from the Internet Feb. 17, 2020] <https://developersgoogle.com/actions/ transactions/>.
Kuwabara Hisao. *Acoustic Properties of Phonemes in Continuous Speech For Different Speaking Rate*, In Proceeding of Fourth International Conference on Spoken Language Processing, ICSLP'96, vol. 4, pp. 2435-2438, Oct. 3, 1996. IEEE.
Maheshware, Sapna. *Burger King 'O.K. Google' Ad Doesn't Seem O.K. With Google*, pp. 1-3, (2017), (online). [Retrieved from the Internet Feb. 17, 2020] <https://www.nytimes.com/2017/04/12/business/burger-king-tv-ad-google-home.html>.
Mukhopadhyay, Dibya et al. *All Your Voices Are Belong to Us: Stealing Voices to Fool Humans and Machines*, 20$^{th}$ European Symposium on Research in Computer Security, pp. 1-20, (2015).
Nichols, Shaun. *"TV Anchor Says Live On-Air 'Alexa, Order Me a Dollhouse'—Guess What Happens Next,"* The Register, pp. 1-5, Jan. 7, 2017. [Retrieved from the Internet Feb. 17, 2020] <https://www.theregister.co.uk/2017/01/07/tv-anchor-says-alexa-buy-me-a-dollhouse-and-she-does/>.
Reynolds, Douglas A. *Speaker Identification and Verification Using Gaussian Mixture Speaker Models*, Speech Communication, vol. 17, No. 11, pp. 91-108, (1995).
Ross, Arun et al. *Information Fusion in Biometrics*, Pattern Recognition Letters, vol. 24, No. 13, pp. 2115-2125, (2003). DOI: 10.1016/S0167-8655(03)00079-5.
Sanderson, Conrad et al. *Identity Verification Using Speech and Face Information*, Digital Signal Processing, vol. 14, No. 5, pp. 449-480, Jul. 29, 2004. DOI: 10.1016/j.dsp.2004.05.001.
Shirvanian, Maliheh et al. *Wiretapping Via Mimicry: Short Voice Imitation Man-In-The-Middle Attacks on Crypto Phones*, In Proceedings of the 2014 ACM SIGSAC Conference on Computer and Communications Security, (12 pages), Nov. 3-7, 2014. DOI: 10.1145/2660267.2660274.
Shivappa, Shankar T. et al. *Audiovisual Information Fusion in Human-Computer Interfaces and Intelligent Environments: A Survey*, Proceedings of the IEEE, vol. 98, No. 10, pp. 1-24, Oct. 2010.
Stephenson, Hilary. *UX Design Trends 2018: From Voice Interfaces to a Need to Not Trick People*, Digital Arts, pp. 1-7, Feb. 13, 2018. [Retrieved from the Internet Feb. 17, 2020] <https://wwwdigitalartsonline.co.uk/features/interactive-design/ux-design-trends-2018-from-voice-interfaces-need-not-trick-people/>.
*ReSpeaker 4-Mic Array for Raspberry Pi*, Seeed Studio, (5 pages). [Retrieved from the Internet Feb. 17, 2020] <https://wwwseeedstudio.com/ReSpeaker-4-Mic-Array-for-Raspberry-Pi-p-2941.html>.
Audacity Team. Audacity Homepage, pp. 1-6. [Retrieved from the Internet Feb. 17, 2020] <https://wwwaudacityteam.org/>.
Titze, Ingo R. et al. *Principles of Voice Production*, The Journal of The Acoustical Society of America, (2 pages), (1998).
Vaidya, Tavish et al. *Cocaine Noodles: Exploiting the Gap Between Human and Machine Speech Recognition*, 11$^{th}$ USENIX Workshop on Offensive Technologies, pp. 1-14, (2015).
Wu, Zhizheng et al. *A Study on Replay Attack and Anti-Spoofing For Text-Dependent Speaker Verification*, In Signal and Information Processing Association Annual Summit and Conference (APSIPA), 2014 Asia-Pacific, pp. 1-5, Dec. 2014.
Zhang, Guoming et al. *DolphinAttack: Inaudible Voice Commands*, Computer and Communications Security (CCS), pp. 103-117, Nov. 3, 2017. DOI: 10.1145/3133956.3134052.

\* cited by examiner

METHOD AND APPARATUS FOR DIFFERENTIATING BETWEEN HUMAN AND ELECTRONIC SPEAKER FOR VOICE INTERFACE SECURITY

CROSS-REFERENCE TO RELATED APPLICATIONS

This application claims priority to U.S. Provisional Application No. 62/686,550, titled "METHOD AND APPARATUS FOR DIFFERENTIATING BETWEEN HUMAN AND ELECTRONIC SPEAKER FOR VOICE INTERFACE SECURITY," filed Jun. 18, 2018, the contents of which are incorporated herein by reference in their entirety.

STATEMENT REGARDING FEDERALLY SPONSORED RESEARCH OR DEVELOPMENT

This invention was made with government support under 1702879 awarded by the National Science Foundation (NSF). The government has certain rights in the invention.

BACKGROUND

Voice interfaces are increasingly becoming integrated into a variety of Internet of Things (IoT) devices. Such systems can dramatically simplify interactions between users and devices with limited displays. Unfortunately, voice interfaces also create new opportunities for exploitation. Specifically, any sound-emitting device within range of the system implementing the voice interface (e.g., a smart television, an Internet-connected appliance, etc.) can potentially cause these systems to perform operations against the desires of their owners (e.g., unlock doors, make unauthorized purchases, etc.).

Thus, there is a need in the art for methods, apparatuses, systems, computing devices, and/or the like that enable differentiation between human and electronic speakers for voice interface security.

BRIEF SUMMARY

To meet this need and others, example embodiments of the present invention provide methods, apparatus, systems, computing devices, computing entities, and/or the like for differentiating between human and electronic speakers for voice interface security. Embodiments of the present disclosure programmatically detect fundamental differences in audio created by humans and electronic speakers. Embodiments identify sub-bass over-excitation, or the presence of significant low frequency signals that are outside of the range of human voices but are inherent to the design of modern speakers, as a strong differentiator between these two sources. As a result of such identification, embodiments of the present disclosure are used to prevent adversarial requests, replayed audio, and hidden commands with a 100%/1.72% TPR/FPR in quiet environments. The present embodiments effectively remove commands injected via nearby audio devices by voice interfaces. Embodiments of the present disclosure enable devices to prevent performance of unwanted actions via a device audio channel. The embodiments significantly improve trust in voice interfaces (especially as they are being used for payments).

BRIEF DESCRIPTION OF THE SEVERAL VIEWS OF THE DRAWING(S)

Having thus described the invention in general terms, reference will now be made to the accompanying drawings, which are not necessarily drawn to scale.

DETAILED DESCRIPTION

Figure 1:
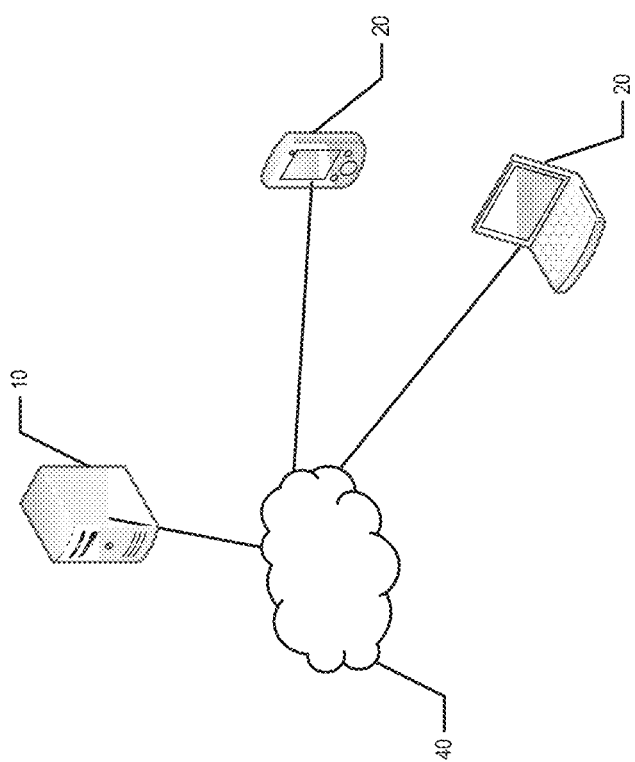
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more analysis computing entities 10, one or more user computing entities 20, one or more networks 40, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Analysis Computing Entity

Figure 2:
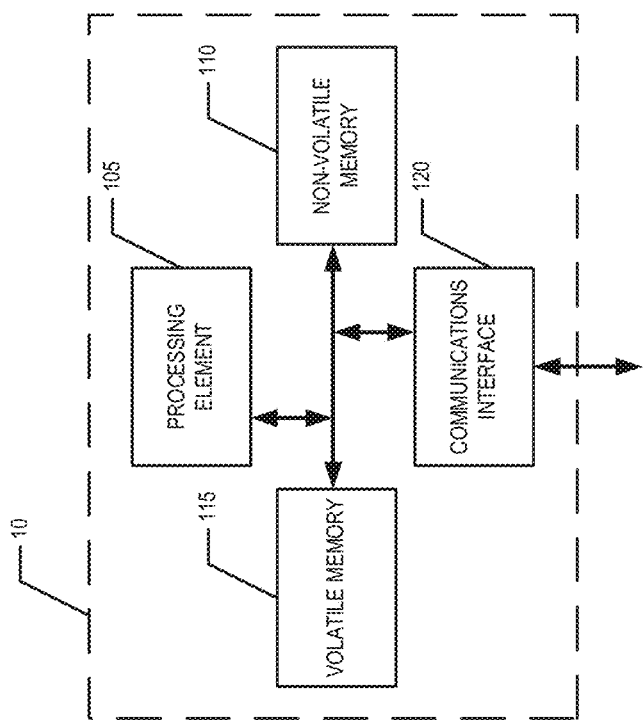
FIG. 2 is an exemplary schematic diagram of an analysis computing entity according to one embodiment of the present invention.

FIG. 2 provides a schematic of an analysis computing entity 10 according to one embodiment of the present invention. In examples, an analysis computing entity may be configured to analyze received audio signals and determine whether the source is a human (i.e., organic) or electronic speaker.

In general, the terms computing entity, computer, entity, device, system, and/or similar words used herein interchangeably may refer to, for example, one or more computers, computing entities, desktops, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the analysis computing entity 10 may also include one or more communications interfaces 120 for communicating with various other computing entities, such as by communicating data, content, information, and/or similar terms used herein interchangeably that can be transmitted, received, operated on, processed, displayed, stored, and/or the like.

As shown in FIG. 2, in one embodiment, the analysis computing entity 10 may include or be in communication with one or more processing elements 105 (also referred to as processors, processing circuitry, and/or similar terms used herein interchangeably) that communicate with other elements within the analysis computing entity 10 via a bus, for example. As will be understood, the processing element 105 may be embodied in a number of different ways. For example, the processing element 105 may be embodied as one or more complex programmable logic devices (CPLDs), microprocessors, multi-core processors, co-processing entities, application-specific instruction-set processors (ASIPs), microcontrollers, and/or controllers. Further, the processing element 105 may be embodied as one or more other processing devices or circuitry. The term circuitry may refer to an entirely hardware embodiment or a combination of hardware and computer program products. Thus, the processing element 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 105 may be configured for a particular use or configured to execute instructions stored in volatile or non-volatile media or otherwise accessible to the processing element 105. As such, whether configured by hardware or computer program products, or by a combination thereof, the processing element 105 may be capable of performing steps or operations according to embodiments of the present invention when configured accordingly.

In one embodiment, the analysis computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 110, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the analysis computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 115, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 105. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 10 with the assistance of the processing element 105 and operating system.

As indicated, in one embodiment, the analysis computing entity 10 may also include one or more communications interfaces 120 for communicating with various other computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analysis computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown in FIG. 2, the analysis computing entity 10 may also comprise a user interface (that can include a display coupled to a processing element). For example, the user interface may include or be in communication with one or more input elements, such as a keyboard input, a mouse input, a touch screen/display input, motion input, movement input, audio input, pointing device input, joystick input, keypad input, and/or the like. The analysis computing entity 10 may also include or be in communication with one or more output elements (not shown), such as audio output, video output, screen/display output, motion output, movement output, and/or the like. These input and output elements may include software components such as a user application, browser, graphical user interface, and/or the like to facilitate interactions with and/or cause display of information/data from the analysis computing entity 10, as described herein. The user input interface can comprise any of a number of devices or interfaces allowing the user computing entity 20 to receive data, such as a keypad (hard or soft), a touch display, voice/speech or motion interfaces, or other input device. In embodiments including a keypad, the keypad can include (or cause display of) the conventional numeric (0-9) and related keys (#, *), and other keys used for operating the user computing entity 20 and may include a full set of alphabetic keys or set of keys that may be activated to provide a full set of alphanumeric keys.

As will be appreciated, one or more of the components of the analysis computing entity may be located remotely from other components of the analysis computing entity 10, such as in a distributed system. Furthermore, one or more of these components may be combined with additional components to perform various functions described herein, and these additional components may also be included in the analysis computing entity 10. Thus, the analysis computing entity 10 can be adapted to accommodate a variety of needs and circumstances. As will be recognized, these architectures and descriptions are provided for exemplary purposes only and are not limiting to the various embodiments.

2. Exemplary User Computing Entity

In various embodiments, a user computing entity 20 may be configured to exchange and/or store information/data with the analysis computing entity 10. In one embodiment, the user computing entity 20 may include one or more components that are functionally similar to those of the analysis computing entity 10 described above. For example, in one embodiment, each user computing entity 20 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces.

III. Exemplary System Operation

The Internet of Things (IoT) holds the potential to increase automation in the daily lives of people. Devices ranging from connected appliances that report when groceries are low to smart thermostats that can anticipate desired temperature changes offer great convenience to their users.

Voice interfaces have become an essential component of IoT devices used in many homes and offices. Given that many of these devices have either limited or entirely lack traditional interfaces, an increasing number now incorporate voice commands as their primary user interfaces. Voice interfaces not only simplify interaction with such devices for traditional users, but promote broader inclusion for both the elderly and those with disabilities.

Voice interfaces also introduce a number of security problems. First, few devices actually authenticate their users. Instead, if a command can be understood by a voice-enabled device, it simply executes the request. Unfortunately, the lack of command authentication has led to various injection attacks by different electronic speakers in its vicinity. These command injections have shown to have various consequences ranging from unauthorized used to financial exploit. Any insecure sound-emitting IoT device (e.g., a networked stereo system or smart TV) near a voice interface may be used to inject commands. An adversary need not necessarily compromise nearby devices to launch a successful attack—voice controlled devices have already been intentionally and unintentionally activated by nearby televisions. Second, while some devices are considering the use of biometrics for authentication, this solution fails in many important cases. For instance, off the shelf tools allow attackers to generate audio targeting specific speakers. Moreover, even if biometrics can protect against these attacks, they do nothing to prevent against replay. Fundamentally, wherever speakers exist, audio can easily be injected to induce voice-interfaces to perform tasks on behalf of an adversary.

The present disclosure addresses these and other problems by programmatically distinguishing between human and electronic speakers. Specifically, embodiments enable the identification of a feature of audio that differs between the human vocal tract and the construction of modern electronic speakers. Analysis of the present embodiments shows that electronic speakers induce what is referred to herein as sub-bass over-excitation, which is the presence of very low-frequency components in the audio waveform that are not naturally produced by humans. This phenomenon is instead a consequence of the enclosures in which electronic speakers are housed. The present disclosure demonstrates that this feature is a reliable indicator in detecting electronic speakers.

The present embodiments provide at least the following improvements:

Identify sub-bass over-excitation phenomenon: Using signal processing, the present embodiments identify a frequency band present in the audio generated by electronic speakers. The present disclosure discusses why sub-bass over-excitation occurs and develop the energy balance metric to effectively measure it;

Experimental evaluation of phenomenon based detector: After explaining sub-bass over-excitation, the present disclosure presents a detector that differentiates between organic and electronic speakers in low noise (TPR: 100%; FPR: 1.72%) and high noise (TPR: 95.7%; FPR: 5.0%) environments. The present disclosure also contextualizes why false positive rates are acceptable based on reported usage data; and Analysis of Adversarial Commands: The present embodiments can accurately identify the speaker as organic or electronic even in the presence of recent garbled audio injection attacks and codec transcoding attacks.

It will be appreciated that the sub-bass over-excitation is not simply a phenomenon limited to a certain class of electronic speakers. Rather, it is a fundamental characteristic of the construction all electronic speakers, be they of high or low quality. Without an adversary gaining physical access to a targeted environment and replacing the electronic speakers with custom-made devices (which, as will be explained, would add significant noise to produced audio), the present embodiments dramatically mitigate the ability to inject commands into increasingly popular voice interfaces.

Figure 3:
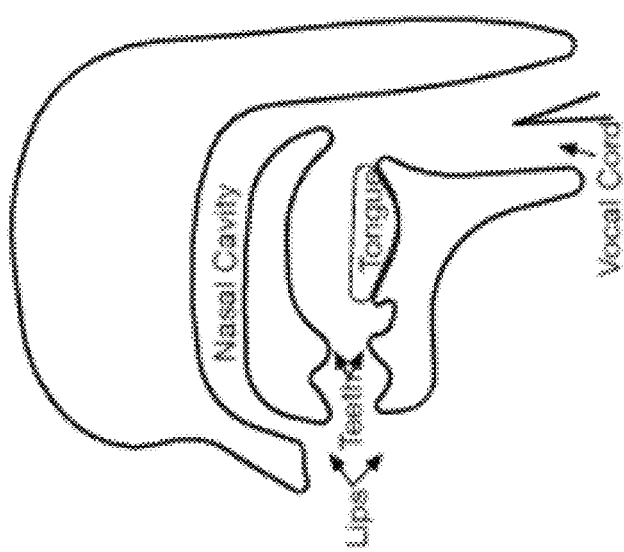
FIG. 3 illustrates the structures that create a human voice.

FIG. 3 illustrates the structures that create a human voice. The human voice is created by the complex interaction of various parts of the human anatomy. Sounds are produced by a combination of the lungs, the larynx, and the articulators (the tongue, cheeks, lips, palate, throat, and nasal cavity). The lungs force air over the rest of the vocal tract allowing it to produce sound. The larynx contains the vocal cords which are responsible for the generation of the fundamental frequency (e.g., a person's fundamental frequency is the lowest frequency present in their voice) present in the voice. Since the vocal cords are located at the bottom of what is essentially a closed tube, the fundamental frequency induces an acoustic resonance. This resonance generates harmonic frequencies of the fundamental frequency as it travels up and out of the human speaker's vocal tract. The articulators then alter the waveform generated by the vocal cords in order to produce the wide range of sound present in human speech. Specifically, articulators block or greatly diminish the amplitude of certain harmonics for different parts of speech. Engineers often simplify the human vocal tract into the Source-filter Model.

In the Source-filter Model, the human vocal tract is modeled as an underlying sound that is being filtered. Typically, women and men have fundamental frequencies between 165-255 Hz and 85-180 Hz respectively. By generating a frequency (x) within a closed tube, the column of air will vibrate not just at the given frequency, but at every harmonic frequency higher than that (2×, 3×, . . . n×). The rest of the vocal tract acts as a filter, removing certain harmonics in order to produce various sounds.

The acoustic waveform generated by a human speaker is defined by the physical characteristics of the human speaker's vocal tract. For example, men typically have larger vocal cords than women, which vibrate at a lower rate and thus cause men to have lower pitched voices. However, one can still make some generalization about the average human speaker despite the great variation in physical characteristics. Since articulators do not add new frequency components, the fundamental frequency is the lowest frequency that can be present in a human voice.

Figure 4:
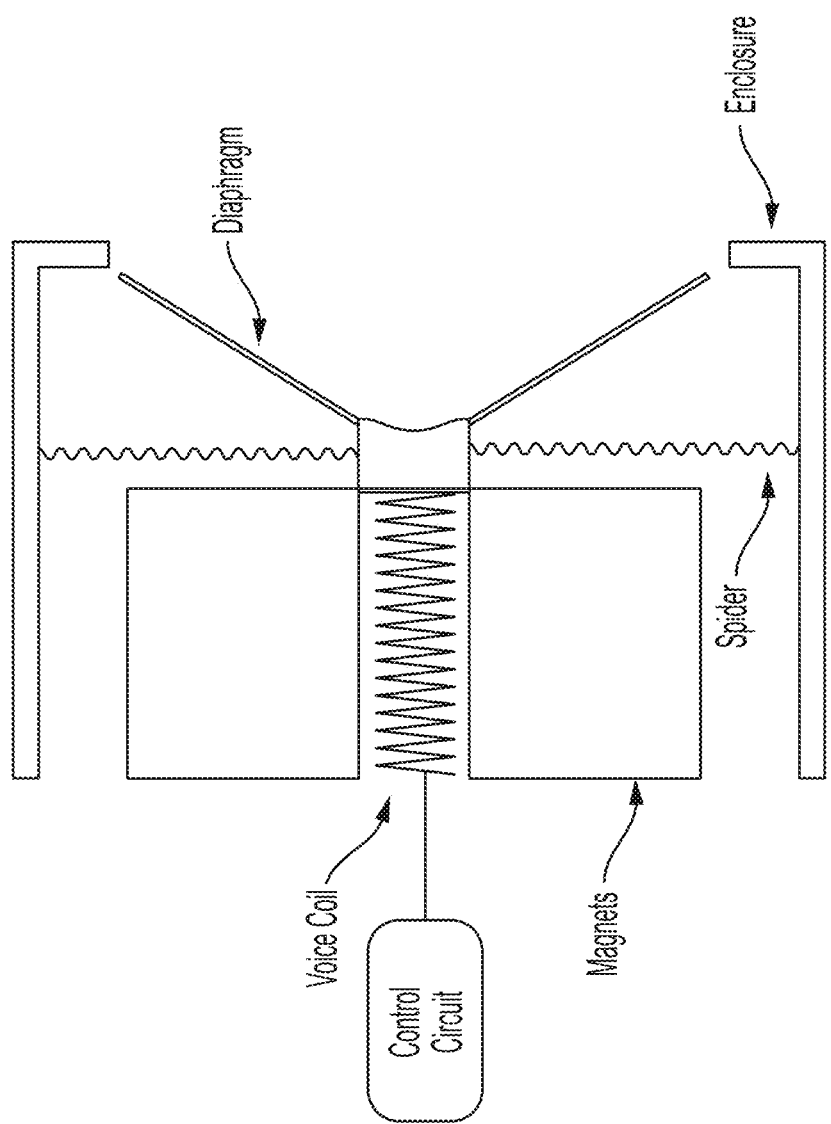
FIG. 4 illustrates a diagram of an electronic speaker.

FIG. 4 illustrates a simplified diagram of a modern electronic speaker. The electronic speakers reproduce sound by oscillating a diaphragm in an appropriate way to reproduce the recorded sound. The diaphragm displaces the air nearby and causes a pressure wave to propagate away from it. To oscillate the diaphragm, the electronic speaker uses an electromagnet, called the voice coil, attached to the rear of the diaphragm and located inside the magnetic field of a permanent magnet. The voice coil will induce a magnetic field when current is applied to it. The interactions between the voice coil field and the permanent magnet field will induce a force onto the voice coil and the diaphragm, causing it to move. The final critical component to a basic electronic speaker is the spider, a spring that attaches the oscillating coil and diaphragm assembly to the case. The spider must allow the diaphragm to move as freely as possible while also ensuring that the diaphragm does not separate from the case. In addition, it must ensure that the voice coil/diaphragm assembly return to its neutral point when not in the presence of a magnetic field. The material selection of the spider has a large impact on the overall performance of the electronic speaker.

An electronic speaker's design performance can be evaluated by looking at its frequency response curve. A frequency response curve describes how well an electronic speaker generates a given frequency. This curve is directly related to the physical characteristics of the electronic speaker. Namely, an electronic speaker that can accurately reproduce low frequencies will struggle to reproduce higher frequencies and vice versa. The reason that this trade off exists has to do with how energy is transferred by a wave. In order to understand why this occurs, imagine two electronic speakers, one playing a 30 Hz tone and one playing a 3000 Hz tone. If both electronic speakers have the same excursion (e.g., physical oscillation distance) and diaphragm size, then the electronic speaker playing the 3000 Hz tone will cause the same pressure wave as the other electronic speaker 100 times more often. Since each pressure wave carries a set amount of energy, the 3000 Hz electronic speaker will output 100 times more energy than the 30 Hz electronic speaker and thus will be significantly louder to a listener. In order for a 30 Hz electronic speaker to produce just as much acoustic energy as the 3000 Hz electronic speaker, it needs to produce more energy per wave. This is possible by increasing a combination of the diaphragm's size and the excursion distance so that the 30 Hz electronic speaker is displacing 100 times more air per oscillation than the 3000 Hz electronic speaker. However, this has consequences on the other components of the electronic speaker. Since the diaphragm is displacing more air per oscillation, the voice coil will need to be larger to induce a stronger magnetic field and the spider will have to become stiffer to accommodate the higher amounts of momentum from the heavier voice coil and diaphragm. If the new larger electronic speaker plays a higher frequency, say 3000 Hz, the higher dampening from the stronger spider would drastically reduce the amount of excursion the electronic speaker can achieve, thus reducing the amount of energy output and making higher tones significantly quieter than the lower tones. This is why many sound systems separate speakers for different frequency ranges.

Lastly, electronic speaker designers have to deal with the effects of the enclosure or case. Since every material has a resonance or natural frequency, an electronic speaker designer must account for its enclosure's vibration. Typically these enclosures resonate at somewhere in the sub-bass (20-80 Hz) region. Audio engineers design enclosures such that their resonance frequency is in this range to minimize its impact on the sound. The sub-bass region is so low in the frequency spectrum that it is generally experienced as a pressure rather than being heard in the traditional sense. It is important to note that the enclosure will resonate whenever the electronic speaker is producing sound since it is being used as the anchor point for the spider.

Exemplary Setting and Adversary

Adversary: The adversary's goal is to inject audio commands to a target device that has a voice interface. A remote adversary is assumed to be capable of compromising any electronic device in the room except the device implementing the voice interface. The simplest adversary would leverage devices such as TVs and radios through commercials or content that the user actively turned on. Alternatively, more advanced adversaries could comprise multiple devices around the target device. These compromised devices could then inject audio into the space (e.g., the room) without the user's consent. This type of adversary could have access to a wide range of different electronic speakers; ranging from smart TVs, computers, IP enabled webcams, or high quality speaker systems. Additionally, the adversary does not have physical access to the device. This constraint prevents the adversary from inserting their own speaker near the target device. However, this is a minor constraint since with physical access an adversary could trivially perform commands by speaking.

Microphones:

In order to detect an electronic speaker's increased sub-bass components, microphones of the present embodiments possess the following properties. First, the microphones must be capable of accurately detecting frequencies in the sub-bass region (20-80 Hz). Second, the microphones must have a known frequency response curve. Microphones, just as electronic speakers, behave differently at different frequencies. By knowing the frequency response curve of the microphones the present embodiments are able to compensate for any error they may incur while recording the audio. Lastly, the microphones are controllable. This requirement ensure that the data coming from the microphone has not been tampered with. Without this property an adversary could trivially defeat the present technique by removing any sub-bass components before passing the audio along to be verified.

Electronic Speakers:

In embodiments of the present disclosure, the adversary can have nearly full control over the electronic speaker that is playing the audio. An adversary can control the electronic speaker's location, volume, and directionality. Additionally, an adversary could have a range of commercially available electronic speakers to be used to play the audio. As discussed herein, electronic speakers are designed with audio quality in mind. This implies that all enclosures will resonate in the sub-bass region to prevent affecting any of the other more important acoustic regions. The adversary's only strict constraint is that they cannot physically alter the speaker. If an adversary altered the speaker's enclosure so that its resonant frequency moved outside of the sub-bass region, the present technique could be defeated unless altered in some way.

Audio Sample:

In embodiments, the adversary is allowed to have full control over the audio which is played over the electronic speaker. The adversary is free to add noise to the sample, filter out components of the sample, or change relative frequency intensities of the sample. Regardless of what the adversary does, a non-tampered speaker will still resonate in the sub-bass region more so than an organic speaker.

Speech originating from an organic speaker is defined by a fundamental frequency that exists in the bass region, leaving the sub-bass region devoid of energy. In contrast, audio created by an electronic speaker will have more energy in the sub-bass region due to the resonance of the enclosure. The electronic speaker is said to have driven components in the sub-bass region since some part (the enclosure) is actively creating these frequencies. By detecting the relative amount of energy in the sub-bass region the present embodiments can differentiate between electronic and organic speakers.

Figure 5A:
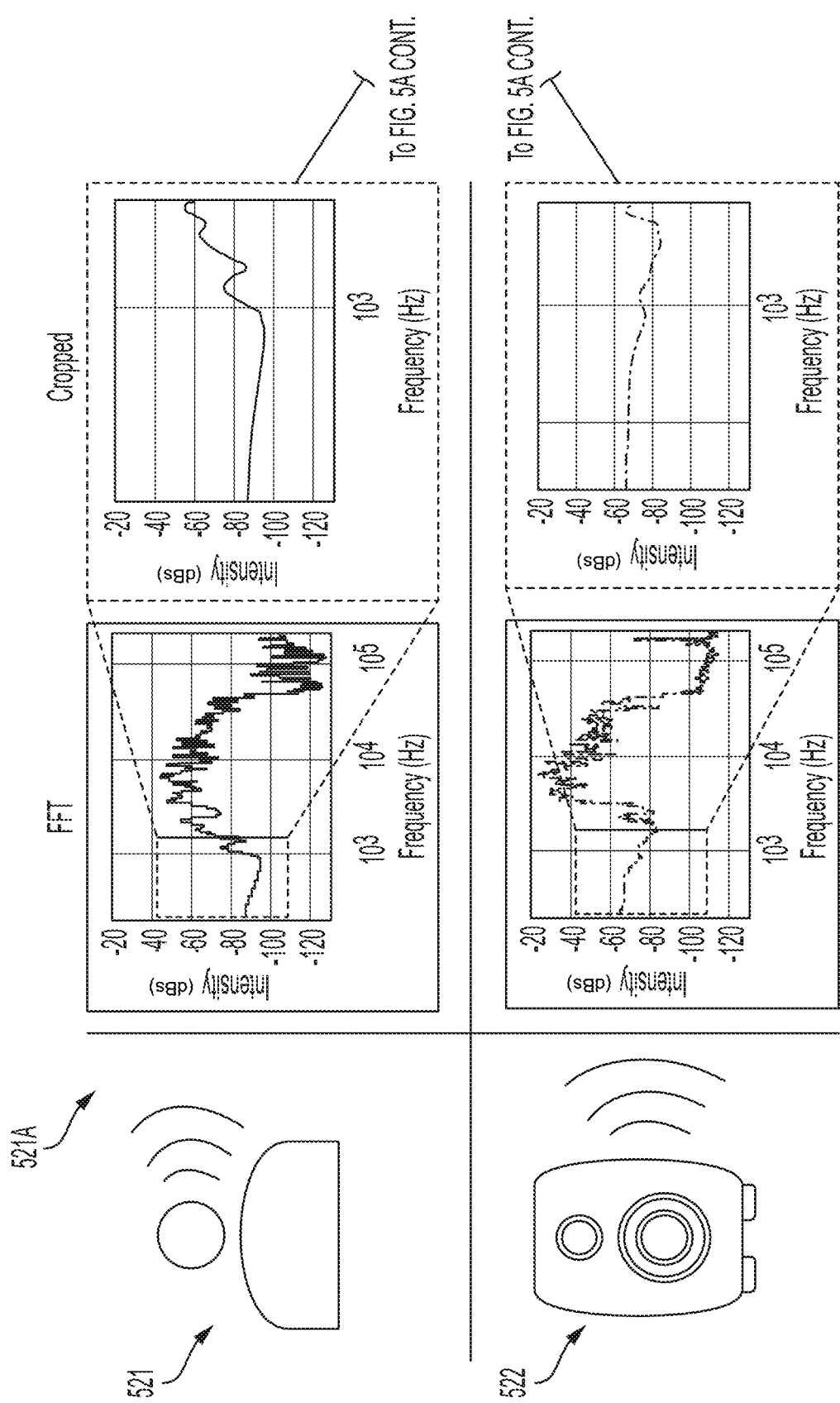
FIG. 5A illustrates an exemplary human and electronic speaker detection process according to embodiments of the present disclosure.
Figure 5A:
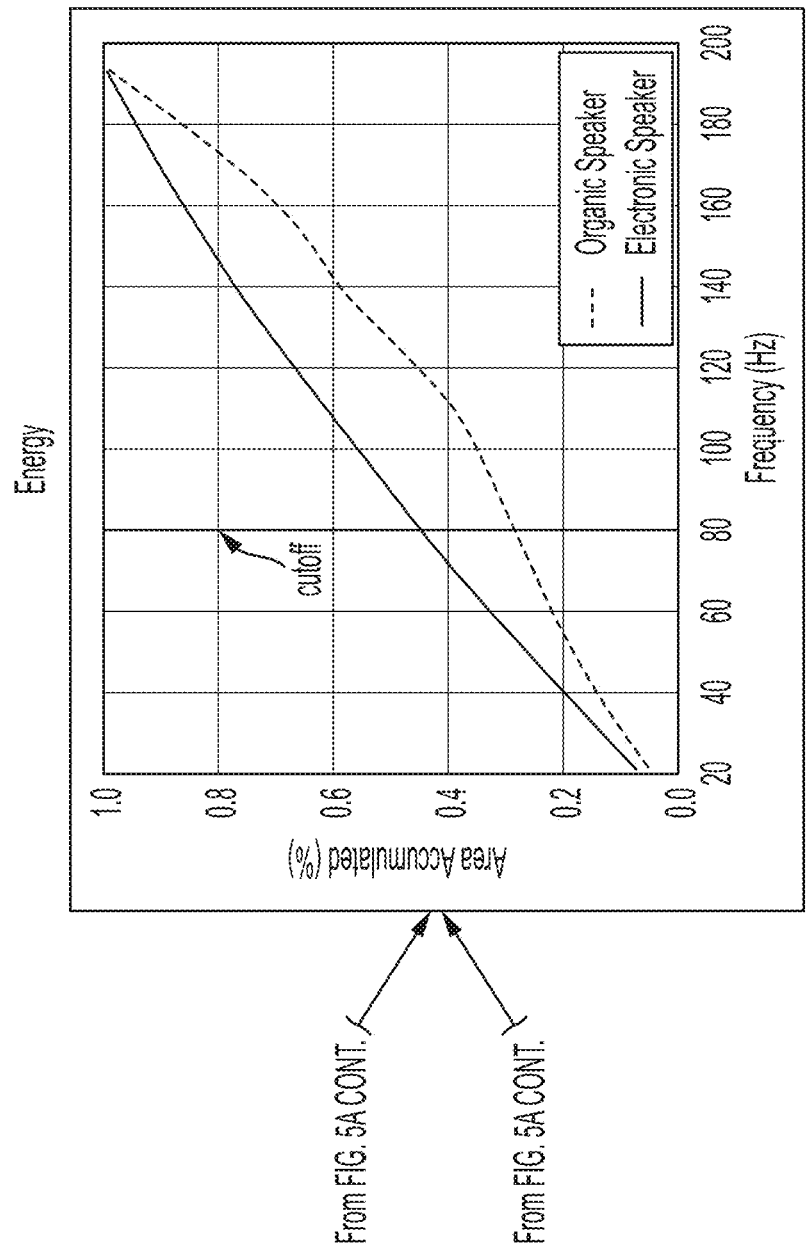

FIG. 5A illustrates an exemplary human and electronic speaker detection process according to embodiments of the present disclosure. In embodiments, checking for sub-bass over-excitation occurs through visual or electronic inspection of a spoken command's Fast Fourier Transform as can be seen in FIG. 5A. The Fast Fourier Transform (FFT) is an algorithm that divides a signal into its different frequency components and their amplitudes. Once again, sub-bass over-excitation is the presence of a driven component in the sub-bass region of a command. While organic speakers fundamentally lack driven sub-bass components, electronic speaker produce them due to enclosure resonance. Shown in FIG. 5A, the FFT is calculated of a command being spoken by a user 521 and then being replayed via an electronic speaker 522. That is, an FFT 521A is calculated of the command being spoken by a user 521, and an FFT 522A is calculated of the command being replayed via an electronic speaker 522. The sub-bass region in the command played through an electronic speaker has a higher intensity than the same region in the spoken command. Additionally, these FFTs 521A 522A highlight some potential complications the present metric will need to overcome.

Figure 5B:
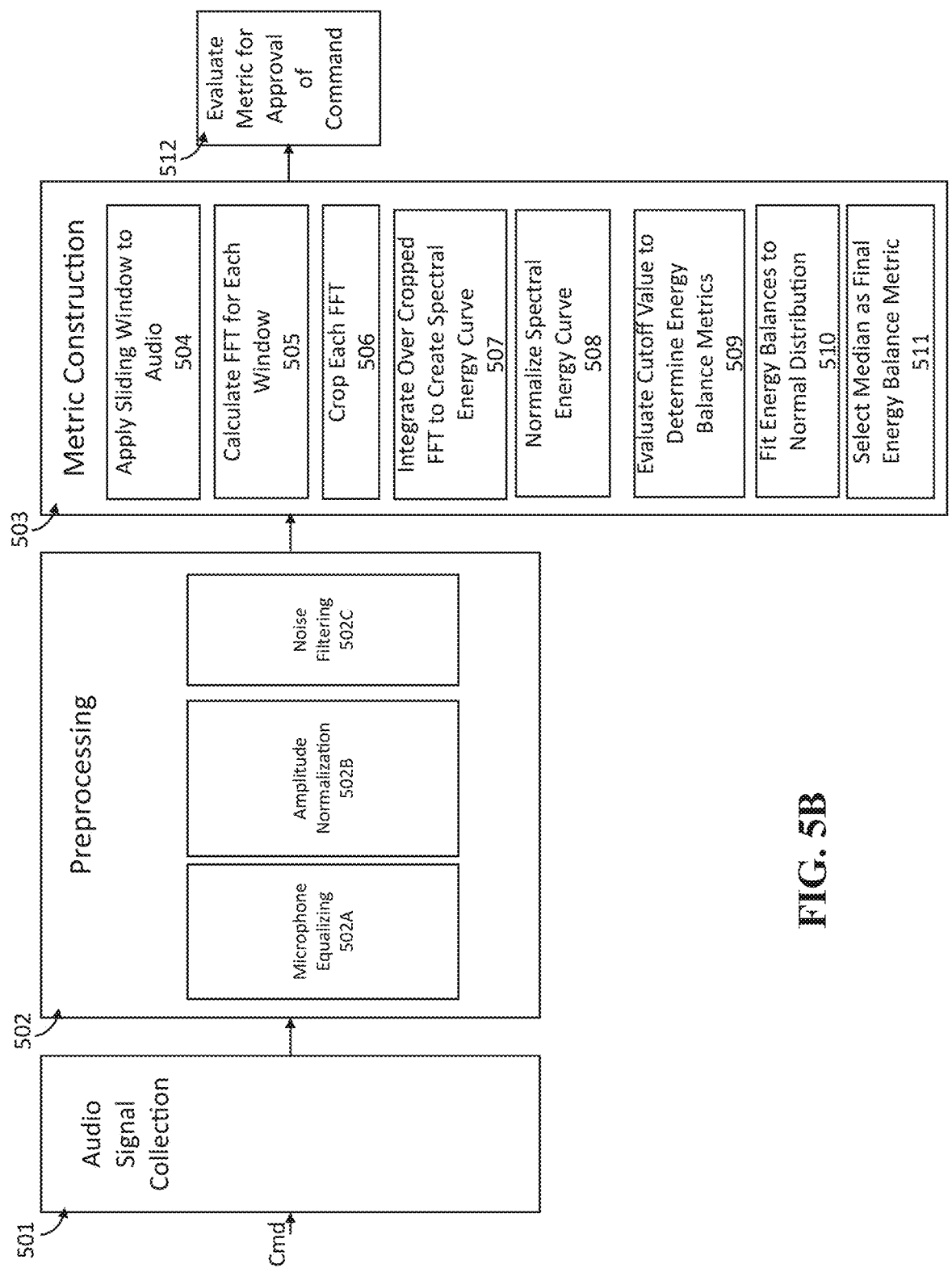
FIG. 5B illustrates an exemplary human and electronic speaker detection process according to embodiments of the present disclosure.

FIG. 5B illustrates an exemplary detection process according to embodiments of the present disclosure. In embodiments, an exemplary detection process comprises collection 501 of audio signals. In embodiments, the collection 501 of audio signals is accomplished using a microphone array 531. In embodiments, preprocessing 502, using signal pre-processing circuitry 532, is applied to the collected audio signals. In embodiments, preprocessing 502 comprises microphone equalizing 502A, amplitude normalization 502B, and noise filtering 502C.

In embodiments, the an energy balance metric is constructed 503 via a series of signal processing steps. In embodiments, a sliding window is applied 504 to the recorded audio. In embodiments, a window size can be 0.1 seconds long with no overlap. By applying 504 a sliding window to the input audio, the energy balance metric of the present disclosure is robust against sub-bass variation with respect to time. This is accomplished by computing an energy balance metric for every window and normalization of the sample at the end as is described below. FIG. 5A shows an overview of how the present energy balance metric is calculated for a single window.

In embodiments, the calculation 503 of the energy balance metric continues with calculating 505 an FFT for each window. In embodiments, an FFT is calculated with 4096 output points for each window. FFTs average frequency amplitude across the sample to which they are applied, which makes them susceptible to outliers. By windowing the audio command, outlying amounts of sub-bass can be prevented from background noises or certain phonemes from skewing the data. Once again, this is handled by the normalization described below.

In embodiments, the calculation 503 of the energy balance metric continues with cropping 506 each FFT down to contain only certain frequencies (e.g., between 20 Hz and 250 Hz). There is a trade-off between the size of the sliding window and the FFT. The larger the FFT, the more data points within the cropping frequency range. However, larger FFTs require more audio samples (time) as input and become more susceptible to outliers in the sub-bass region. The window and FFT size selection allows maintenance a large enough number of points in this frequency range (21 points) while having a short enough time window to become robust to sub-bass outliers. The cropping 506 of the FFT makes changes in the sub-bass region easier to detect. The average phoneme length for a speaker falls somewhere between 100-300 ms.

In embodiments, the calculation 503 of the energy balance metric continues with integrating 507 over the cropped FFT to create a spectral energy curve. The spectral energy curves represents the total energy of the audio in the defined frequency range (e.g., 20-250 Hz range).

In embodiments, the calculation 503 of the energy balance metric continues with normalizing 508 the spectral energy curve so that an area underneath the spectral energy curve is equal to one. This makes the value at any point along the spectral energy curve equal to the cumulative distribution function.

In embodiments, the calculation 503 of the energy balance metric continues with evaluating 509 the normalized energy curve to define a cutoff value, which leads to an energy balance metric. In other words, a point (i.e., cutoff value) is selected along the normalized energy curve that defines a separation of the sub-bass and bass regions. An example cutoff value can be seen in the last panel of FIG. 5A. In embodiments, a cutoff value of 80 Hz is selected. At that point, a normalized energy curve evaluates to the total percentage of energy that is present in the sub-bass. This is equivalent to the following equation:

$$\text{energy balance metric} = \frac{E_{Sub\text{-}bass\ Region}}{E_{Total\ Evaluated\ Region}} \quad (1)$$

where $E_{Sub\text{-}bass\ Region}$ represents the energy accumulated in the sub-bass region and $E_{Total\ Evaluated\ Region}$ is the energy accumulated in the entire region or range being examined (20-250 Hz). By examining the sub-bass region in this way, the energy balance metric of the present disclosure is robust against various different enclosure shapes. Whether the sub-bass over-excitation is spread out or concentrated into a single peak, the amount of energy present in that region will remain approximately the same.

It is at this point that the earlier cropping 506 of the FFT has an impact. By cropping 506 the FFT, the sub-bass region becomes a larger portion of the total energy represented. This means that smaller changes in the amount of spectral energy in the sub-bass region will result in larger changes to the normalize energy balance. Additionally, the FFT cropping 506 allows a second phenomenon to be detected that is common with small and low end speakers: they struggle to reproduce bass frequencies. This means that electronic speakers produce too much energy in the sub-bass region, while simultaneously having too little energy in the bass region. This causes the energy curve from an electronic speaker to further deviate from that of an organic speaker.

Finally, the metric of the present disclosure must handle variation in the sub-bass with respect to time as discussed earlier. In embodiments, the calculation 503 of the energy balance metric continues with fitting 510 the accumulated energy balances to a normal distribution. The accumulated energy balances are fit 510 to the normal distribution by removing outliers based on skewdness of the data. This prevents outlying sub-bass components from affecting the final energy balance.

In embodiments, the calculation 503 of the energy balance metric completes by selecting 511 a median value from the data as the final energy balance metric.

Finally, in embodiments, the final energy balance metric may be evaluated 512 to determine whether to approve or process the received command (i.e., the received command is trustworthy for completion and will be passed to a host processor for processing and performing).

Figure 5C:
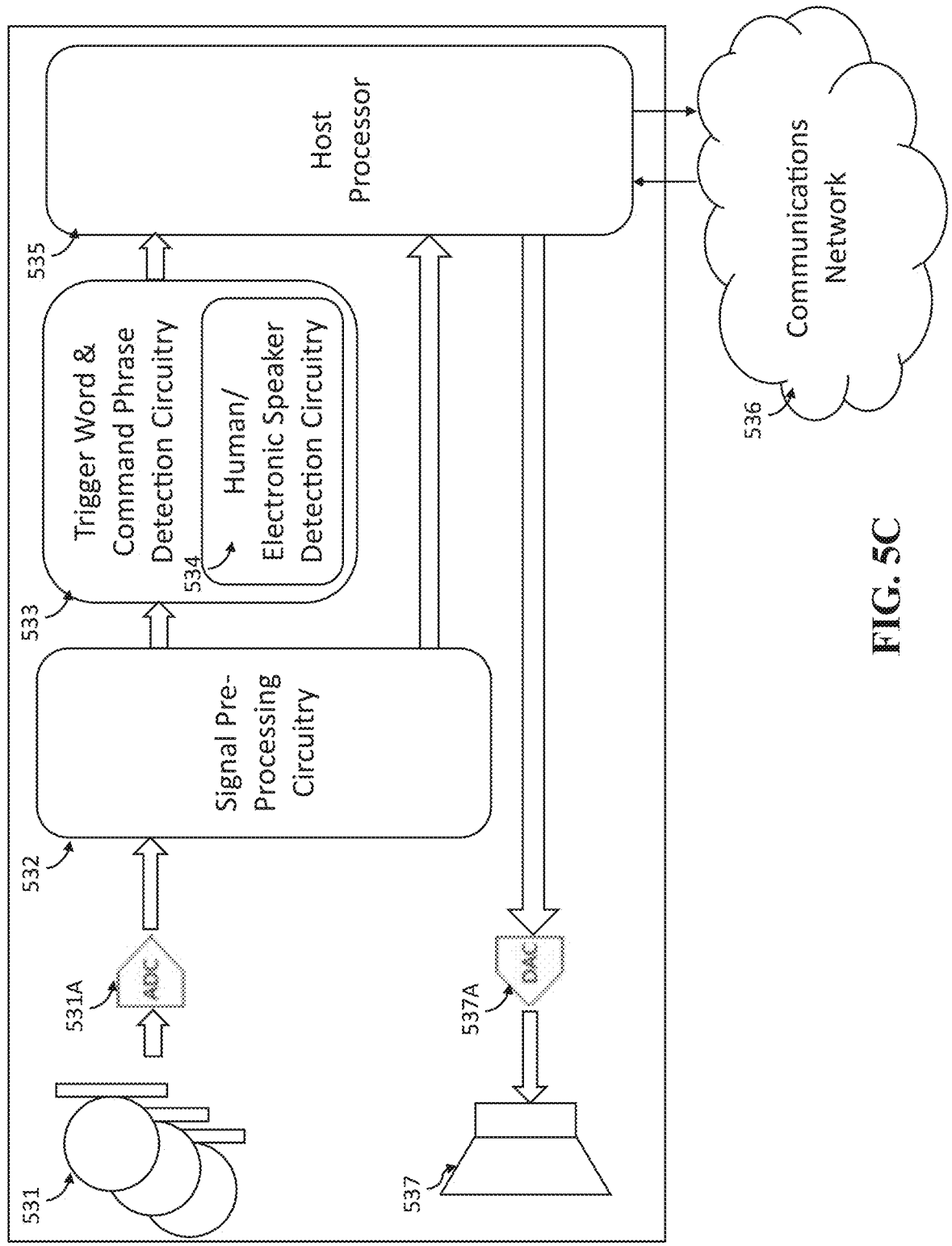
FIG. 5C illustrates an exemplary human and electronic speaker detection system according to embodiments of the present disclosure.

FIG. 5C illustrates an exemplary detection system according to embodiments of the present disclosure.

In embodiments, an exemplary detection system comprises a microphone array 531 for receiving a command signal. The output from the microphone array 531 is passed through an analog-to-digital converter (ADC) 531A to signal pre-processing circuitry 532. The signal pre-processing circuitry is configured to perform the above described signal pre-processing steps. Once signal pre-processing is complete, the output is provided to detection circuitry 533 configured to detect trigger words and/or command phrases. Human/electronic speaker detection circuitry 534 is configured to calculate and evaluate the present energy balance metric (as described above with respect to FIG. 5B). If the energy balance metric meets a given threshold (e.g., it is determined that the command was provided by a human and not an electronic speaker), the command is passed for processing to a host processor 535. In embodiments, the host processor 535 communicates via a communications network 536 in order to retrieve information to provide a response to the command. The host processor 535 provides a response to the command to its own electronic speaker 537 by way of a digital-to-analog converter (DAC) 537A so that the response can be provided in an audio linguistic manner.

By way of example, an exemplary experimental setup is explained as follows. In an exemplary experiment, all of the commands were recorded using a far field microphone array (Respeaker 4-mic Array for Raspberry Pi®) that is similar to arrays in devices like the Amazon Echo®. For simplicity the Respeaker microphone array is used as a stand in for this devices. The Respeaker array consists of four PCB mounted microphones produced by Knowles. In comparison the Google Home® and Amazon Echo Dot® have two and seven PCB mounted microphones produced by TDK® and Knowles® respectively. Microphones can be compared via their signal to noise ratio (SNR). The microphones on the Respeaker array have a lower SNR (59 DBA) than both the Google Home® (65 dBA) and the Amazon Echo Dot® (65 dBA). From this one can discern that the microphones on the Respeaker array capture the least acoustic information out of the three microphones and is the least capable for preforming the present technique.

The present microphone array recorded each of its four microphones onto a separate channel during testing. However, since the present technique does not require multiple recordings, all but one of the channels can be disregarded. This allows for the present technique to be applied to any of the aforementioned devices or any device that contains at least one microphone.

Figure 6:
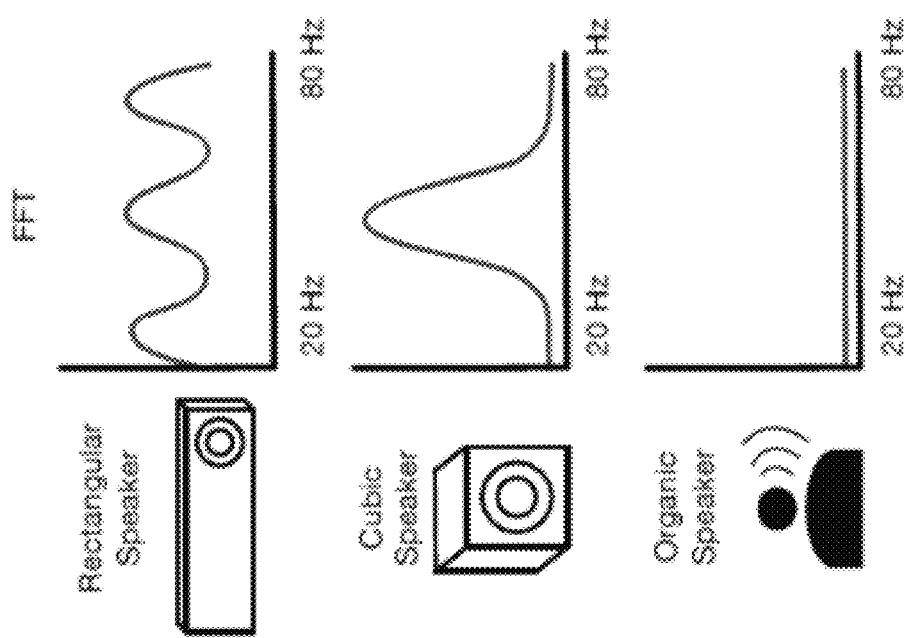
FIG. 6 illustrates FFT dimensions of electronic speakers and an organic (i.e., human) speaker.

FIG. 6 illustrates FFT dimensions of electronic speakers and an organic (i.e., human) speaker. Input commands can be initially noisy. Preprocessing (i.e., 502), according to embodiments of the present disclosure involves three steps: microphone equalizing (502A), amplitude normalization (502B), and noise filtering (502C).

The present microphone array's microphones came with a manufacturer-provided frequency response curve. By equalizing the recorded audio with the frequency response curve of the microphone, the impact they had on the recorded commands can be minimized. Following the equalization, every recording was normalized so that its volume was the same. This ensured that all the recordings are approximately the same intensity before processing occurred.

Noise filtering 502C is the final part of the preprocessing 502. Noise filtering function provided by Audacity was used, in embodiments. The Audacity noise filter constructs a profile of the silence in the command. This profile is an averaged FFT of the silence. Then, the filter uses a sliding window over the audio to construct an FFT for each segment of audio. For each segment the filter checks if each frequency in the segment's FFT is higher than the same frequency in the silence's FFT. If so, the filter does nothing. However, if the frequency in the silence's FFT is higher, the filter subtracts a set amount (48 dBs in embodiments) from that frequency in the segment's FFT. This effectively brings that frequency close to zero and minimizes its impact on the audio. It is important to note that this filter is effectively binary. For example, imagine a room had a constant 10 dBs 100 Hz noise. When a person with a voice that contains 100 Hz speaks at 40 dBs, the resulting 100 Hz component of the recording is the addition of the two sources. When the noise filter compares the silence in the room to the point when the person is speaking, it detects that the 100 Hz frequency is more intense than it was in the silence and leaves it unaltered. Both the person's and the room's components make it through the filter unchanged. Simply put, all driven frequencies in the audio will pass through the noise filter unaltered.

Capturing sub-bass variation is not a straight forward process, and creates two primary challenges. The first of these complications is that different electronic speakers will over excite the sub-bass region differently. This reflects the design of the speaker's enclosure. Specifically, the speaker enclosure's resonant frequency is directly related to the physical dimensions of the speaker. If an enclosure is rectangular, then it has three possible resonant frequencies; one for each pair of parallel walls. Each of the resonant frequencies is defined by the distance between those walls. For instance, if an enclosure was cube, then the speaker's three resonance components would all be identical. This would cause the sub-bass over-excitation to peak at a single frequency. However, if all three dimensions were different the enclosure would have three smaller resonant frequencies. This would cause the over-excitation in the sub-bass to be more evenly distributed throughout the region. This phenomenon can be seen in FIG. 6. To compensate for this the metric of the present disclosure is designed to be resilient to the variation in the sub-bass components driven by the electronic speakers.

The second complication is the variation in the sub-bass with respect to time. That is, an electronic speaker may produce more sub-bass during a given phoneme of a command than another. This is due to how the different frequency component of a phoneme excite the enclosure's resonance. Simply put, certain frequencies will cause the enclosure to resonant more than others. A command recorded from an organic speakers may also contain additional sub-bass from various backgrounds sources. Sources including bumps and knocks in the background can cause higher than normal amounts of sub-bass to be present. These temporary inconsistencies in sub-bass will cause the command's FFT to misrepresent the amount of sub-bass present in the commands. Once again, the metric of the present disclosure is constructed in such manner so that it is robust to this complication.

Evaluation

The performance of a normalized energy balance metric of the present disclosure is evaluated. For testing samples from eight human speakers were collected, four male and four female. Eight speakers is sufficient given that the present technique is not attempting to identify the individual speakers. Both male and female speakers are included to ensure a wide range of speaker pitches. To properly validate the present energy balance metric a large amount of spoken phrases is needed. To satisfy this, each speaker was recorded speaking eight different command phrases described below. These commands were then recorded and played back through eight commercially available electronic speakers that capture a range of different speaker:x speakers used including (A) Music Angel, (B) HP Computer Speakers, (C) Dynex TV, (D) Acer Predator monitor speakers, (E) Samsung Sound Bar, (F) Insigna TV, (G) MacBook Air, and (H) Bose Wave. To determine the effects of background noise on the present detection method, each of the commands was repeated in environments that had low (e.g., normal bedroom) and high (e.g., office space with white noise generators at 50 dB and scattered conversations) background noise levels. In total 1204 samples were obtained: 605 sample points (58 for organic and 547 for electronic speakers) in a low background noise environment and 599 (60 for organic and 539 for electronic speakers) in a high background noise environments.

Figure 7:
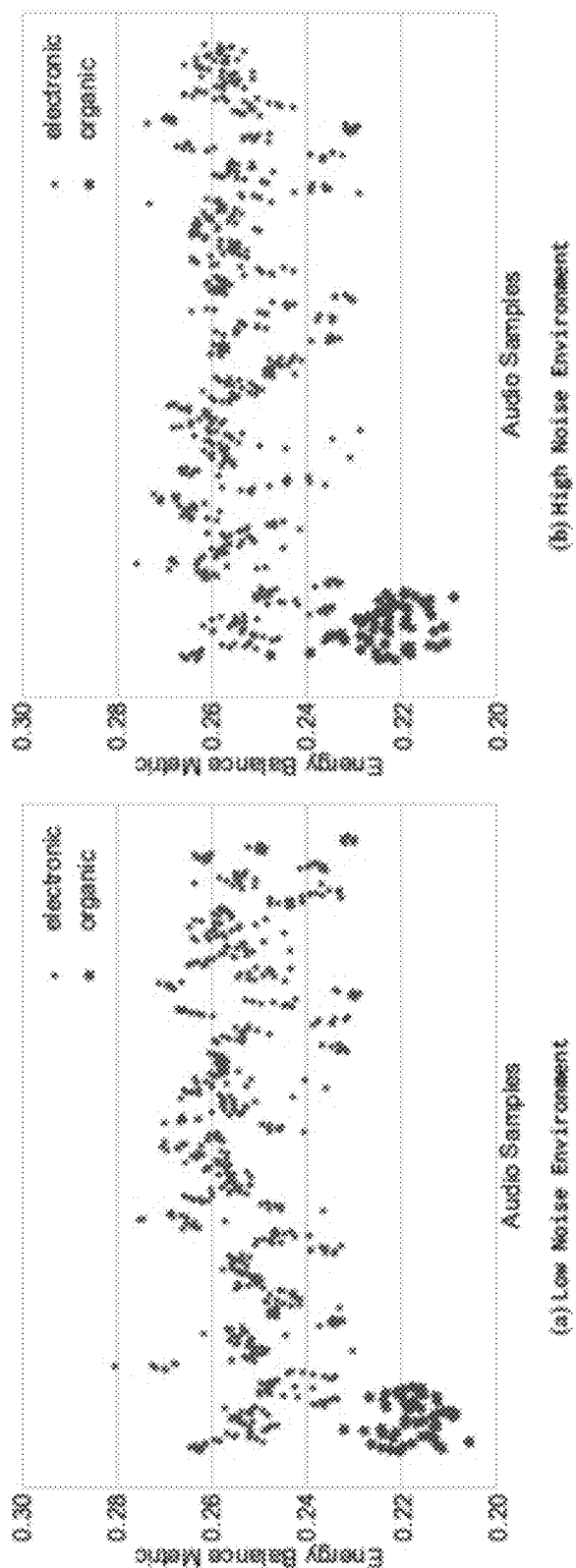
FIG. 7 illustrates exemplary energy balance metrics according to embodiments of the present disclosure.

FIG. 7 illustrates exemplary energy balance metrics for each sample in both testing environments. A qualitative analysis of these graphs shows that organic speakers are more likely to have a lower energy balance than electronic speakers. To determine if the audio sample comes from an organic or electronic speaker, a detector can be built around this phenomena by choosing an optimal threshold limit as a minimum value for electronic speakers.

Figure 8:
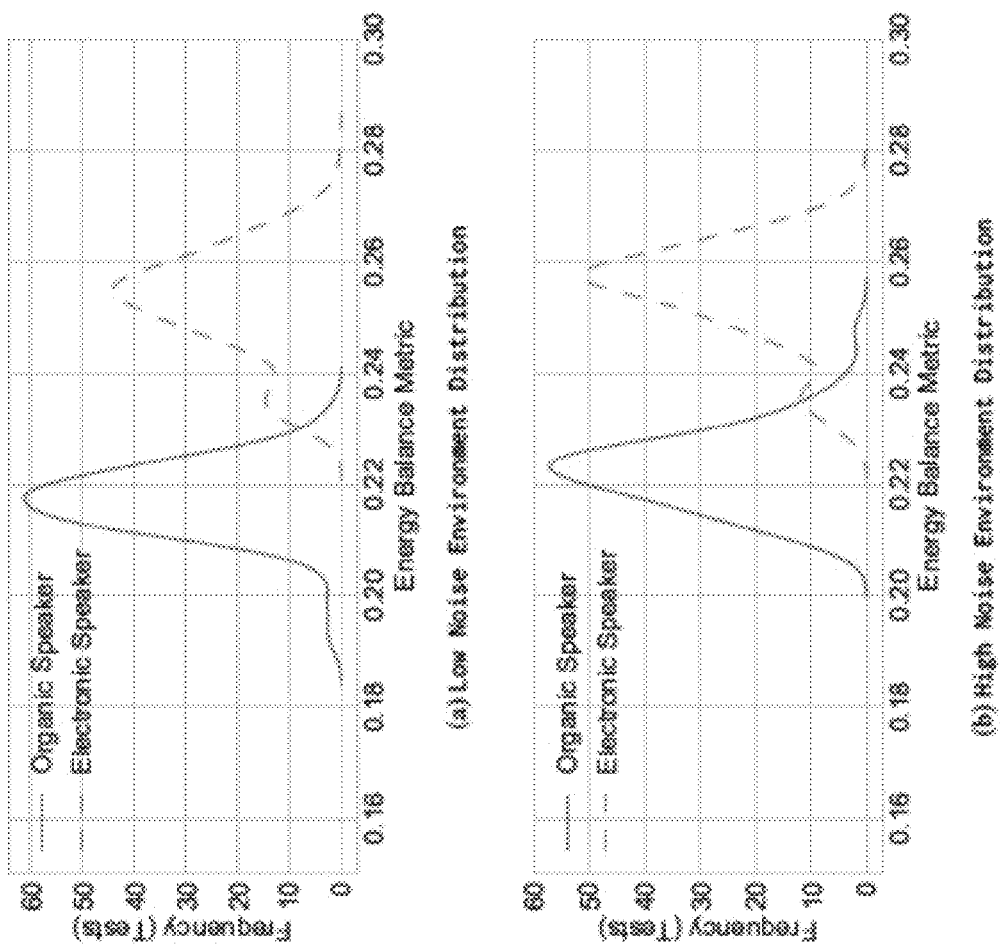
FIG. 8 illustrates exemplary energy balance metrics according to embodiments of the present disclosure.
Figure 9:
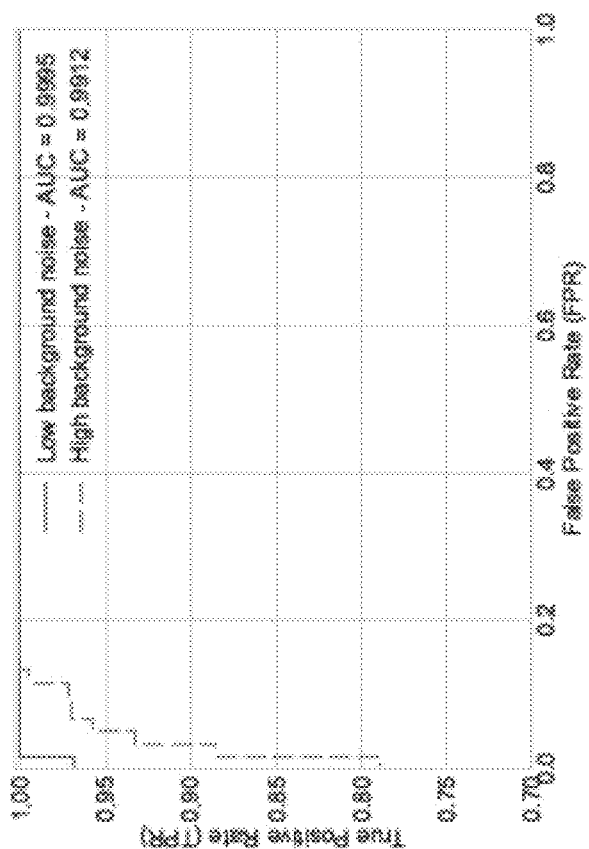
FIG. 9 illustrates exemplary performance trade-offs of a detector according to embodiments of the present disclosure in environments with low and high background noise levels.

FIG. 8 illustrates exemplary energy balance metrics according to embodiments of the present disclosure. FIG. 9 illustrates exemplary performance trade-offs of a detector according to embodiments of the present disclosure in environments with low and high background noise levels.

Before evaluation of the present detector, a threshold limit for the energy balance metric is derived to determine if the audio is coming from an organic rather than an electronic speaker. FIG. 8 shows the distribution of the energy balance metric that comes from both organic speakers and electronic speakers in both testing environments. Since there is an overlap in the distributions for both environments, determining an optimal threshold for the present metric requires a trade-off between false positives (i.e., organic speakers identified as electronic speakers) and true positives (i.e., electronic speakers identified as electronic). To do that, ROC curves are calculated, which give the performance of the present detector under various threshold limits. FIG. 9 shows the performance trade off of the detector in environments with low and high background noise levels. The accuracy of distinguishing between organic and electronic speakers can be measured by calculating the area under the curve (AUC) of each ROC curve, with AUC values closer to 1.0 signifying better performance. From this figure, the AUC of both environments is calculated to be 0.9995 and 0.9912 for low and high noise levels respectively. These values illustrate that the present detector has excellent accuracy in terms of distinguishing between organic and electronic speakers at a wide range of threshold values. However, since this use case application is to prevent injection attacks to voice assistants, the present detector must be optimized to have a high true positive rate (TPR) while still retaining reliable performance (i.e., not stopping actual organic commands). A reliable performance is defined as having a false positive rate (FPR) no greater than 5.0%, which equates to 1 every 20 organic commands being rejected. For reference, most voice assistant users place four voice commands on a daily basis. With the currently set FPR, these users can expect command rejection once every five days. This is a reasonable trade-off because when a command is rejected, the user can simply repeat it.

Figure 10:
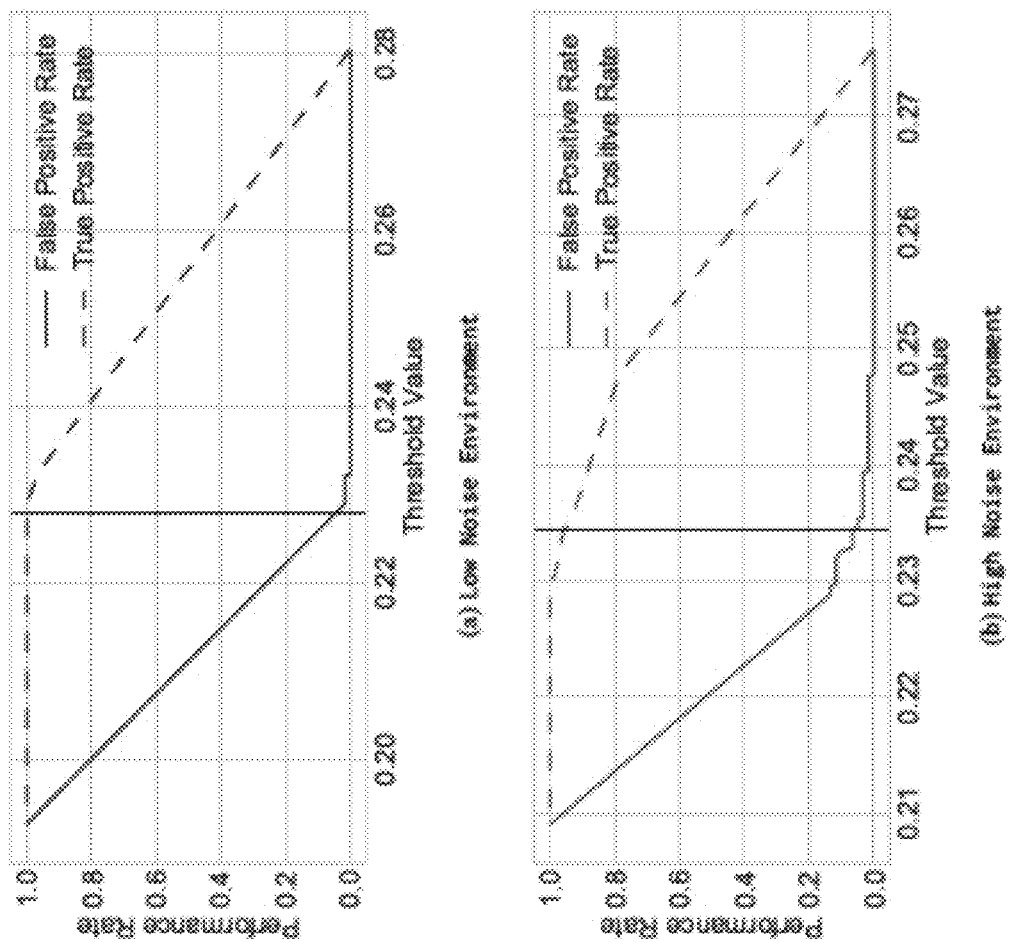
FIG. 10 illustrates exemplary performance output for possible energy balance threshold limits according to embodiments of the present disclosure.

FIG. 10 illustrates exemplary performance output for possible energy balance threshold limits according to embodiments of the present disclosure. For low noise environments, a threshold value of 0.2280 is chosen and achieve a FPR of 1.72% while having a TPR of 100.0% (FIG. 10*a*). For reference, by choosing this threshold for the energy balance metric, the present embodiments correctly stop all injection attacks coming from electronic speakers while minimizing the performance degradation of voice assistants by only stopping 1 every 58 organic voice commands (once every two weeks).

For high noise environments, an energy balance threshold limit of 0.2345 is selected, and achieve performance reliability FPR of 5.0%. However, in this environment the TPR decreases to 95.7%. The drop in accuracy can be attributed to a decrease of performance in organic speakers rather than an increase of performance in electronic speakers. The increase in FPR may be due to the noise filter used in preprocessing, which removes bass components in the organic speakers voice. As discussed above, noise filtering is a step of the present detection mechanism and is binary by nature: if a component of an organic speaker was unable to break the intensity threshold, it was removed. Since female speakers generally contain less intense bass components, the filter removed all traces of the bass components from their voices, which caused their energy balance metrics to skew higher. If true, then one would expect the male speakers to have a similar performance as before. To test this hypothesis, the highest male energy balance was used as a threshold and reanalyzed the data to get a TPR of 99.2%. This TPR confirms the drop in accuracy was caused by the preprocessing filter in a high noise environment. This accuracy can be maintained by simply having the speakers speak loud enough to overcome the effects of the noise (i.e., setting a minimum volume threshold for acceptable commands).

The present embodiments have been shown to be able to differentiate audio between electronic speakers and organic speakers. To demonstrate that the present differentiation technique is statistically significant, an independent sample t-test is used. This is a null hypothesis test that determines if the mean of two populations are equal. For the present experiments, the null hypothesis would indicate that the present technique does not differentiate between organic and electronic speakers in a statistically significant way.

The data was separated out by environments (low and high background noise), the confidence interval was set to $\alpha=0.05$, and then the test was performed on each environment. r-effect was also calculated, which tells the strength of the findings (with >0.5 meaning large effect) and Cohen-d was calculated, which tells how large the effect of the phenomena would be (with >0.8 meaning large).

Low Background Noise.

In total 58 organic and 547 electronic samples were taken. The Cohen-d value for the sample sets was 4.16 with an r-effect of 0.901 indicating a large effect size and the calculated p-value was <0.001 with a power of 1. These results demonstrate an extreme likelihood of a statistically significant difference between both sample sets. Since the populations' means differ, one can reject the null hypothesis and the results are confirmed as statistically significant.

High Background Noise.

In total 60 organic and 539 electronic samples were taken. The Cohen-d value for the sample sets was 3.71 with an r-effect of 0.880 indicating a large effect size and the calculated p-value was <0.001 with a power of 1. These results demonstrate an extreme likelihood of a statistically significant difference between both sample sets. Since the populations' means differ, again the null hypothesis can be rejected and the results are confirmed as statistically significant.

Figure 11:
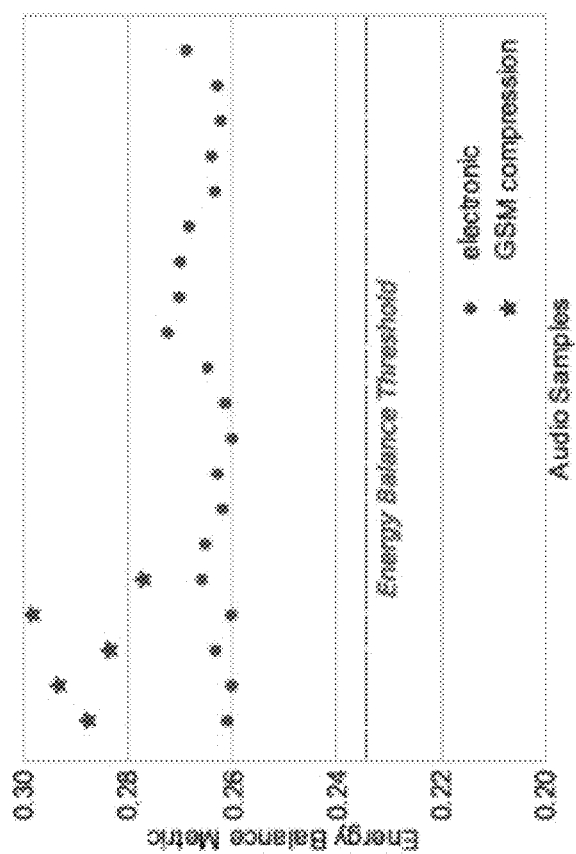
FIG. 11 illustrates exemplary energy balance metrics according to embodiments of the present disclosure.
Figure 12D:
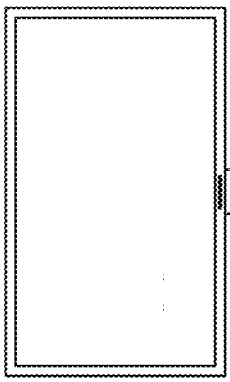
FIG. 12 illustrates exemplary electronic speakers for use with embodiments of the present disclosure.
Figure 12H:
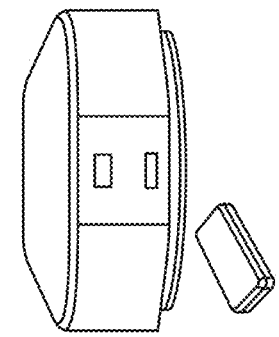
Figure 12C:
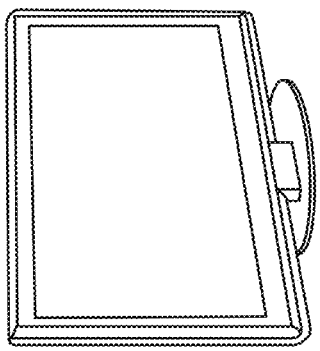
Figure 12G:
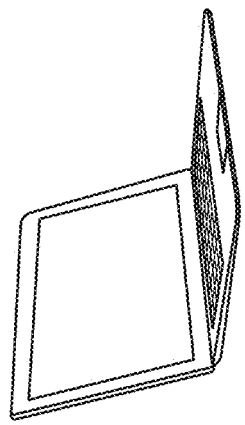
Figure 12B:
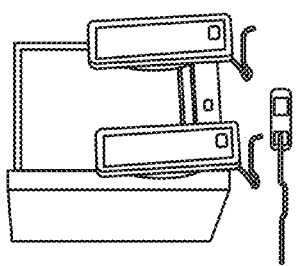
Figure 12F:
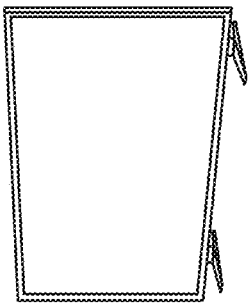
Figure 12A:
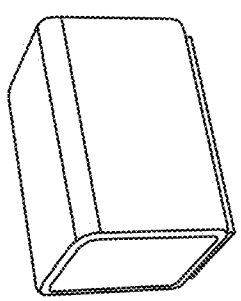
Figure 12E:
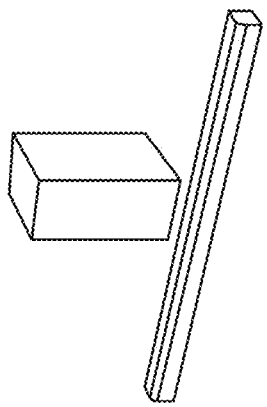

FIG. 11 illustrates exemplary energy balance metrics according to embodiments of the present disclosure. The present embodiments were tested with two different attack vectors for voice command injections.

Hidden Commands.

Audio samples from 10 different hidden commands were passed. These audio files were specifically made to trick voice assistants to recognizing commands even if the commands themselves were not discernible to humans. Since the audio samples were artificially created, they could only be played through electronic speakers (rather than organic). Samples were again tested in environments with low and high background noise levels. The minimum value for the energy balance metric for the adversarial samples was 0.2601 (shown in FIG. 9). By using the threshold limits derived earlier in this section, the present embodiments were able to correctly detect (and reject) each audio sample as an electronic speaker.

Codec Transcoding Attacks.

Lossless way encoding was used in all previous experiments. However, an adversary may attempt to bypass the present detection mechanism by using alternate encoding schemes. For instance, an adversary can inject commands to voice assistants by playing the command itself from a phone call. In this case, because the audio comes from a phone call, the audio must first go through a codec that compresses the audio before it gets sent through the cellular network. Alternatively, because GSM codecs remove both high and low frequencies, an adversary may believe this approach can fool the present detector. To test the present detector under this attack vector, a sample set of the collected audio was passed through a GSM-FR codec and then measured the energy balance metric of the compressed audio. Again, in FIG. 11, the energy balance value for each compressed audio sample is shown. These samples are easily detected even with energy balance limit set to the derived high noise threshold.

FIG. 12 illustrates exemplary electronic speakers for use with embodiments of the present disclosure. The present experiments were performed using a wide range of different speakers. It is believed that the speakers used are representative of a wide range of commercially available speaker. Broadly, electronic speakers can be broken into two distinct categories, single driver and multi-driver systems. Single driver systems contain electronic speakers that are responsible for producing the full frequency range. In contrast, multi-driver systems have different electronic speaker dedicated for different frequency ranges. The test set included both classes.

Single Driver Speaker Systems.

Single driver systems are common in devices that are inexpensive or more size constrained. It can be appreciated that the vast majority of speakers in IoT devices and smartphones to fall in this category. In the present testing, the Music Angel (A), Dynex TV (C), Acer Predator Computer Monitor (D), Insignia TV (F), and MacBook Air (G) are all single driver systems. As discussed above, different frequency ranges require different physical characters to produce. As a result, single driver systems have frequency response curves with more variance and struggle to produce intense bass components. In addition to the electronic speaker's sub-bass over-excitation, the present energy metric also captures the lack of bass in the audio. The decreased amount of bass components will make the sub-bass contributions appear larger, thus increasing the detectability of the speaker. Due to their lack of bass and sub-bass over-excitation, single driver speakers are the easiest for the present metric to detect. Additionally, these types of speakers are the most likely to be compromised by an adversary given their extensive use in commodity devices.

Multi-Driver Speaker Systems.

Multi-driver systems are common in more expensive and dedicated electronic speakers. These systems contain dedicated speakers designed to produce different frequencies ranges, the most common of which is a bass speaker to produce low frequencies. The HP Computer Speakers (B), Samsung Sound Bar (E), and Bose Wave IV (H) from the present testing are all multi-driver systems. Dedicated bass speaker enclosures can be broken into either ported (HP Computer Speakers and Samsung Sound Bar) or non-ported (Bose Wave IV) designs. Ported speakers are the more common of the two types, with non-ported speakers generally only being used in single enclosure devices like the Bose Wave IV. Ported bass speakers are designed to increase the amount of sub-bass over-excitation generated by the speaker. The port amplifies the case's resonance frequency to create a more "powerful" bass notes that can be felt by the listener. As a direct result of this the sub-bass region is over-excited more for a ported bass speaker than a non-ported bass speaker.

Additionally, multi-speaker systems usually have flatter, more natural frequency response curves. Their improved frequency response characteristics could make them harder for the present technique to detect. However, ported bass speakers are common amongst high end multi-driver speaker systems. As a result, the present embodiments can easily detect these kinds of systems due to the intentional amplification of the sub-bass region.

In contrast, non-ported bass speakers do not amplify their sub-bass region intentionally. This makes non-ported dedicated bass speakers difficult for the present technique to detect. In order to detect a non-ported bass speaker the present embodiments identify only the non-amplified sub-bass over-excitation. In the present testing, the playback from the Bose speaker was the most similar to the original commands, however they were still able to be reliably detected.

Exemplary command phrases are below. These simulate real queries to voice interfaces and force the organic speaker to enunciate each sentence. The last entry forces the speaker to voice a variety of phonemes.

"Google, Browse to evil.com."
"O.K. Google, call grandma."
"O.K. Google, record a video."
"Hey Google, text John buy spam today."
"Hey Google, post I'm so evil on Twitter."
"Alexa, call grandpa."
"Alexa, text mom what was my social security number again?"
"These puffy tarantulas cross bravely shepherding homeless grouper through explosions."

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for distinguishing between a human voice generated command and an electronic speaker generated command, the system comprising:
   a microphone array for receiving an audio signal collection;
   preprocessing circuitry configured for converting the audio signal collection into processed recorded audio signals;
   energy balance metric determination circuitry configured for calculating a final energy balance metric based on the processed recorded audio signals,
   wherein calculating the final energy balance metric comprises:
      applying a sliding window to the recorded audio signals to produce a plurality of recorded audio signal windows;
      for each recorded audio signal window:
         calculating a fast Fourier transform (FFT) for the recorded audio signal window to produce a recorded audio signal window FFT;
         cropping the recorded audio signal window FFT down such that a resulting cropped recording audio signal window FFT comprises frequencies within a defined frequency range;
         integrating over the cropped recording audio signal window FFT to produce a spectra energy curve;
         normalizing the spectral energy curve such that an area underneath the spectral energy curve is equal to one; and
         defining a cutoff value based on the normalized spectral energy curve, wherein the cutoff value represents a separate of sub-bass and bass regions and defines an energy balance metric for the recorded audio signal window;
      fitting the energy balance metrics for each of the recorded audio signal windows to a normal distribution to produce a normalized energy balance metric distribution; and
      assigning a median value from the normalized energy balance metric distribution to the final energy balance metric; and
   energy balance metric evaluation circuitry for outputting a command originator signal based at least in part on the final energy balance metric.

2. The system of claim 1, wherein the preprocessing circuitry comprises circuitry for microphone equalizing, amplitude normalization, and noise filtering.

3. The system of claim 1, wherein the spectral energy curve represents total energy of the associated recorded audio signal in the defined frequency range.

4. The system of claim 1, wherein the defined frequency range is between 20 Hz and 250 Hz.

5. The system of claim 1, wherein the FFT is calculated with 4096 output points for each recorded audio signal window.

6. The system of claim 1, wherein a size of a recorded audio signal window is 0.1 seconds.

7. The system of claim 6, wherein the recorded audio signal windows do not overlap one another.

8. The system of claim 1, wherein normalizing the spectral energy curve results in a value at any point along the spectral energy curve equal to a cumulative distribution function.

9. The system of claim 1, wherein the energy balance metric for a recorded audio signal is equivalent to the following equation:

$$\text{energy balance metric} = \frac{E_{Sub\text{-}bass\ Region}}{E_{Total\ Evaluated\ Region}} \qquad (1)$$

where $E_{Sub\text{-}bass\ Region}$ represents energy accumulated in the sub-bass region and $E_{Total}$ Evaluated Region is energy accumulated in the defined frequency range.

10. The system of claim 1, wherein fitting the energy balance metrics for each of the recorded audio signal windows to a normal distribution to produce a normalized energy balance metric distribution comprises removing outliers based on a skewdness of the energy balance metrics.

11. The system of claim 1, wherein the command original signal indicates whether the audio signal collection originated from a human voice or from an electronic speaker.

12. A method for distinguishing between a human voice generated command and an electronic speaker generated command, comprising:
   receiving an audio signal collection;
   converting the audio signal collection into processed recorded audio signals;
   calculating a final energy balance metric based on the processed recorded audio signals;

wherein calculating the final energy balance metric comprises:
  applying a sliding window to the recorded audio signals to produce a plurality of recorded audio signal windows;
  for each recorded audio signal window:
    calculating a fast Fourier transform (FFT) for the recorded audio signal window to produce a recorded audio signal window FFT;
    cropping the recorded audio signal window FFT down such that a resulting cropped recording audio signal window FFT comprises frequencies within a defined frequency range;
    integrating over the cropped recording audio signal window FFT to produce a spectra energy curve;
    normalizing the spectral energy curve such that an area underneath the spectral energy curve is equal to one; and
    defining a cutoff value based on the normalized spectral energy curve, wherein the cutoff value represents a separate of sub-bass and bass regions and defines an energy balance metric for the recorded audio signal window;
  fitting the energy balance metrics for each of the recorded audio signal windows to a normal distribution to produce a normalized energy balance metric distribution; and
  assigning a median value from the normalized energy balance metric distribution to the final energy balance metric; and
outputting a command originator signal based at least in part on the final energy balance metric.

13. The method of claim 12, wherein converting the audio signal collection into processed recorded audio signals comprises microphone equalizing, amplitude normalization, and noise filtering.

14. The method of claim 12, wherein the spectral energy curve represents total energy of the associated recorded audio signal in the defined frequency range.

15. The method of claim 12, wherein the defined frequency range is between 20 Hz and 250 Hz.

16. The method of claim 12, wherein the FFT is calculated with 4096 output points for each recorded audio signal window.

17. The method of claim 12, wherein a size of a recorded audio signal window is 0.1 seconds.

18. The method of claim 12, wherein the energy balance metric for a recorded audio signal is equivalent to the following equation:

$$\text{energy balance metric} = \frac{E_{Sub\text{-}bass\ Region}}{E_{Total\ Evaluated\ Region}} \quad (1)$$

where $E_{Sub\text{-}bass\ Region}$ represents energy accumulated in the sub-bass region and $E_{Total\ Evaluated\ Region}$ is energy accumulated in the defined frequency range.

19. The method of claim 12, wherein fitting the energy balance metrics for each of the recorded audio signal windows to a normal distribution to produce a normalized energy balance metric distribution comprises removing outliers based on a skewdness of the energy balance metrics.

20. The method of claim 12, wherein the command original signal indicates whether the audio signal collection originated from a human voice or from an electronic speaker.

* * * * *